(12) United States Patent
Bengfort et al.

(10) Patent No.: US 8,880,445 B2
(45) Date of Patent: Nov. 4, 2014

(54) METHOD AND APPARATUS FOR PERFORMING DYNAMIC TEXTUAL COMPLEXITY ANALYSIS USING MACHINE LEARNING ARTIFICIAL INTELLIGENCE

(75) Inventors: Benjamin Bengfort, Washington, DC (US); Katie Palencsar, Baltimore, MD (US); William Voorhees, Seattle, WA (US)

(73) Assignee: Unbound Concepts, Inc., Columbia, MD (US)

( * ) Notice: Subject to any disclaimer, the term of this patent is extended or adjusted under 35 U.S.C. 154(b) by 173 days.

(21) Appl. No.: 13/592,242

(22) Filed: Aug. 22, 2012

(65) Prior Publication Data
US 2013/0282628 A1    Oct. 24, 2013

Related U.S. Application Data

(60) Provisional application No. 61/636,283, filed on Apr. 20, 2012.

(51) Int. Cl.
*G06F 15/18*    (2006.01)
*G06F 17/30*    (2006.01)

(52) U.S. Cl.
CPC ............ *G06F 15/18* (2013.01); *G06F 17/3061* (2013.01)
USPC .......................................................... 706/12

(58) Field of Classification Search
USPC .......................................................... 706/12
See application file for complete search history.

(56) References Cited

U.S. PATENT DOCUMENTS

| | | | |
|---|---|---|---|
| 6,716,032 B2 | 4/2004 | Reisz et al. | 434/178 |
| 8,510,302 B2 * | 8/2013 | Sweeney et al. | 707/736 |
| 8,539,096 B2 * | 9/2013 | Voorhees et al. | 709/238 |
| 8,560,477 B1 * | 10/2013 | Petrov et al. | 706/46 |
| 8,600,777 B2 * | 12/2013 | Schoenberg et al. | 705/3 |
| 8,600,830 B2 * | 12/2013 | Hoffberg | 705/26.3 |
| 8,606,811 B2 * | 12/2013 | Johnson et al. | 707/769 |
| 8,620,678 B2 * | 12/2013 | Gotlib et al. | 705/2 |
| 8,626,794 B2 * | 1/2014 | Liao et al. | 707/791 |
| 8,676,563 B2 * | 3/2014 | Soricut et al. | 704/2 |
| 8,676,722 B2 * | 3/2014 | Sweeney et al. | 706/12 |
| 8,688,673 B2 * | 4/2014 | Sarkar | 707/706 |
| 8,725,770 B2 * | 5/2014 | Koide et al. | 707/783 |
| 8,738,374 B2 * | 5/2014 | Jaroker | 704/235 |
| 2006/0121433 A1 | 6/2006 | Adams | 434/323 |
| 2007/0292826 A1 | 12/2007 | Goddy et al. | 434/156 |

* cited by examiner

*Primary Examiner* — Michael B Holmes
(74) *Attorney, Agent, or Firm* — Kimberly McLean, Esq.

(57) ABSTRACT

A data processing system including one or more client devices, wherein each client device is connected to a network system and a data center unit. The data center unit includes a network interface unit, a user interface, one or more storage devices, wherein the one or more storage devices comprise one or more databases. Further, the data center unit includes a storage device controller and database manager for controlling the operation of storage devices and databases, a web server for providing web services to clients, a database server for providing database services to the one or more clients and a machine learning artificial intelligence application server for predicting textual complexity of data. The machine learning artificial intelligence application server includes one or more databases for storing data used to refine textual complexity analysis for improved accuracy of textual complexity predictions.

20 Claims, 4 Drawing Sheets

Data Center Unit

335

| <batch ID (1)> | <predicted ranking(1)> | <user ID(1)> | <user rating (1)> |
|---|---|---|---|
| . . . | . . . | . . . | . . . |
| . . . | . . . | . . . | . . . |
| <batch ID (n)> | <predicted ranking (n)> | <user ID (n)> | <user rating (n)> |

| <feature ID (1)> | <weight (1)> |
|---|---|
| . . . | . . . |
| . . . | . . . |
| <feature ID (n)> | <weight (n)> |

FIG. 3B

METHOD AND APPARATUS FOR PERFORMING DYNAMIC TEXTUAL COMPLEXITY ANALYSIS USING MACHINE LEARNING ARTIFICIAL INTELLIGENCE

CROSS-REFERENCE TO RELATED APPLICATIONS

The application claims the benefit of priority of U.S. Provisional Application Ser. No. 61/636,283 filed on Apr. 20, 2012, the disclosure of which is incorporated herein by reference in its entirety.

FIELD OF THE INVENTION

The present disclosure generally relates to computerized analysis of electronic data, and in particular, the disclosure relates to a mechanism for processing electronic literature and textual documents to accurately predict its textual complexity.

BACKGROUND OF THE INVENTION

Modern reading instruction recommends students to be matched to their individually assessed reading level and therefore the determination of textual complexity of educational material is now a requirement for educators to exactly match readers to the texts of their ability level. There are currently two general methods for determining the complexity of a text: quantitatively measuring features that have been proposed to have a strong influence on its complexity, or qualitatively inferring the complexity via subjective human experience.

Both of these mechanisms are heavily criticized by educational professionals for falling short in several areas. First, current quantitative analysis tends to either over or under level particular pieces of text. Second, current qualitative analysis is highly subjective, not repeatable, and takes a significant amount of time to perform.

The present disclosure is directed toward, but not limited to, improving the above noted problems by combining the benefits of quantitative analysis and qualitative analysis with a machine learning algorithm to determine the complexity of a given piece of text.

SUMMARY OF THE INVENTION

Exemplary embodiments disclosed herein provide an apparatus and method for performing dynamic textual complexity analysis using machine learning artificial intelligence. The apparatus, for example, includes one or more client devices, wherein each client device is connected to a network system and a data center unit, and whose interactions are controlled by a local user interface. The data center unit includes a network interface unit for interfacing with the one or more client devices and the network system, an administrative user interface and one or more storage devices. The one or more storage devices comprise one or more databases.

Further, the data center unit includes a storage device controller and database manager for controlling the operation of storage devices and databases, a web server for providing web services to clients, a database server for providing database services to the one or more clients and a machine learning artificial intelligence application server for predicting textual complexity of data. The machine learning artificial intelligence application server includes one or more databases for storing data used to refine textual complexity analysis for improved accuracy of textual complexity predictions.

The method, for example, includes receiving input data, formatting the received input data, storing the formatted data on a storage device and performing quantitative analysis of the input data in parallel with performing qualitative analysis of the input data. A complexity analysis is performed on the input data using the data generated from the performed quantitative analysis and qualitative analysis to predict the textual complexity of the input data. Machine learning artificial intelligence is used to refine predictions of the textual complexity of the input data.

BRIEF DESCRIPTION OF THE DRAWINGS

FIGS. 3A and 3B illustrate an entry in a first and second database respectively.

DETAILED DESCRIPTION

The present disclosure describes a data processing system and mechanism for predicting textual complexity of data using machine learning artificial intelligence. The system includes a plurality of client devices and a machine learning artificial intelligence processing unit. The mechanism uses a machine learning algorithm to predict the complexity of text. The machine learning algorithm continues to improve the predictions of textual complexity through ongoing refinements.

Figure 1:
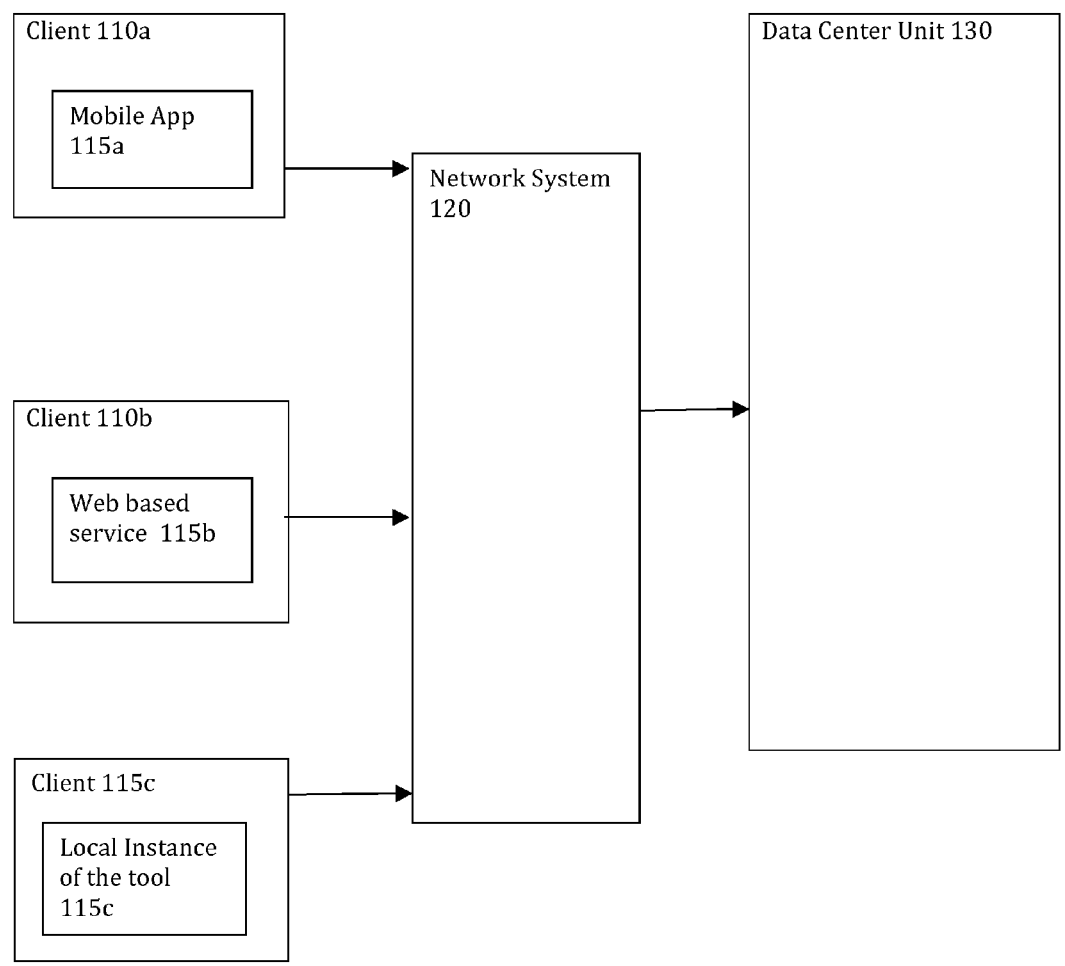
FIG. 1 is a block diagram illustrating an exemplary embodiment of a data processing system as disclosed herein.

FIG. 1 is a diagram illustrating an exemplary embodiment of a data processing system 100. The system includes client devices 110 a-c communicating over network system 120 with data center unit 130. The network system interconnects client devices with the data center unit. While a limited number of client devices, network system and data center unit have been shown, any number of these elements may be used.

Client devices 110 a-c, can be any computer processing device, such as, for example, a mobile phone, laptop, desktop, any kind of handheld computer processing system, a personal computer, minicomputer, microprocessor, workstation, mainframe, or similar computing platform. Each client device includes a processor, memory, communication modules, display, user interface and applications. The communication modules include a network module, such as, for example, a wireless network card, for communication with network system 120 and data center unit 130. The communication modules can be processors embedded with computer readable instructions that when executed perform various communication functions.

Client devices 110 a-c include a controller and data storage device (not shown). The controller can include one or more microprocessors, computer readable memory (e.g., read-only memory (ROM), random access memory (RAM), mechanisms and structures for performing I/O operations. The controller can execute an operating system for execution on the central processing unit and one or more application programs to control the operation of the client devices. The data storage device stores one or more databases, the operating system and one or more application programs, such as, for example, text analyzer 115 a-c.

Client devices 110 *a-c* include text analysis and feedback module 115 *a-c*. The text analysis and feedback module can be one or more processors embedded with computer readable instructions that when executed perform, for example, a mobile application process on a mobile phone for text analysis or a local application tool on a computer processing device for text analysis. Additionally, client device 110 may access a web based application of the text analysis and feedback module via a web browser. The text analysis and feedback module receives results from, and contributes input data to a machine learning algorithm within data center unit 130.

Network system 120 may include a plurality of computers or servers (not shown) located in many different geographic locations. The network system may comprise, for example, a wide area network (WAN), a local area network (LAN) or the Internet. The network system provides communication among the devices in the data processing system using one or more communications protocols, such as, for example, TCP/IP or CDMA.

Data center unit 130 is located at a remote location and includes one or more scalable servers, one or more storage devices, a data control unit and a network interface and system for network communication with client devices 110 *a-c*.

Figure 2:
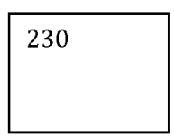
FIG. 2 is a block diagram illustrating an exemplary embodiment of a data center unit.
Figure 2:
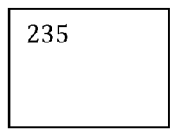
Figure 2:
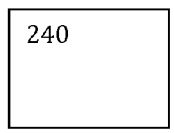
Figure 2:
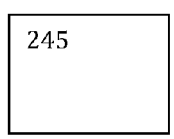
Figure 2:
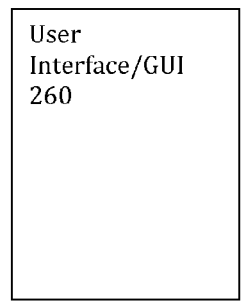
Figure 2:
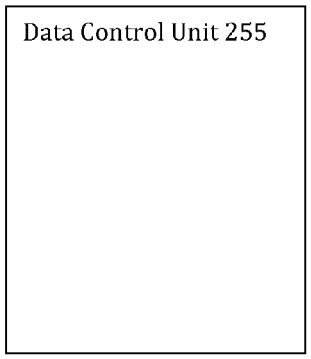
Figure 2:
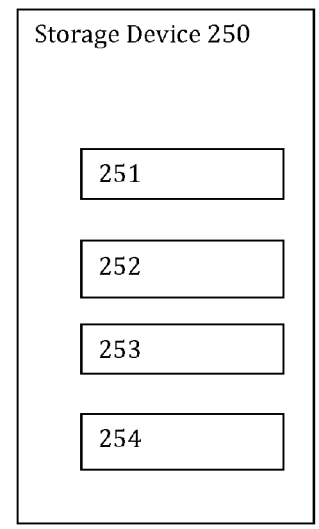

As illustrated in FIG. 2, in a preferred exemplary embodiment, data center unit 130 comprises network interface unit 230, a machine learning artificial intelligence ("MLAI") application server 235, web server 240, database server 245, storage device 250, database 251, programs and code 252, data/files 253, digital library 254, data control unit 255 and administrative user interface 260.

Network interface unit 230 provides communication with network system 120 and client devices 110 *a-c*. Data is transferred to and from the data center unit 130 via the network interface unit.

Figure 4:
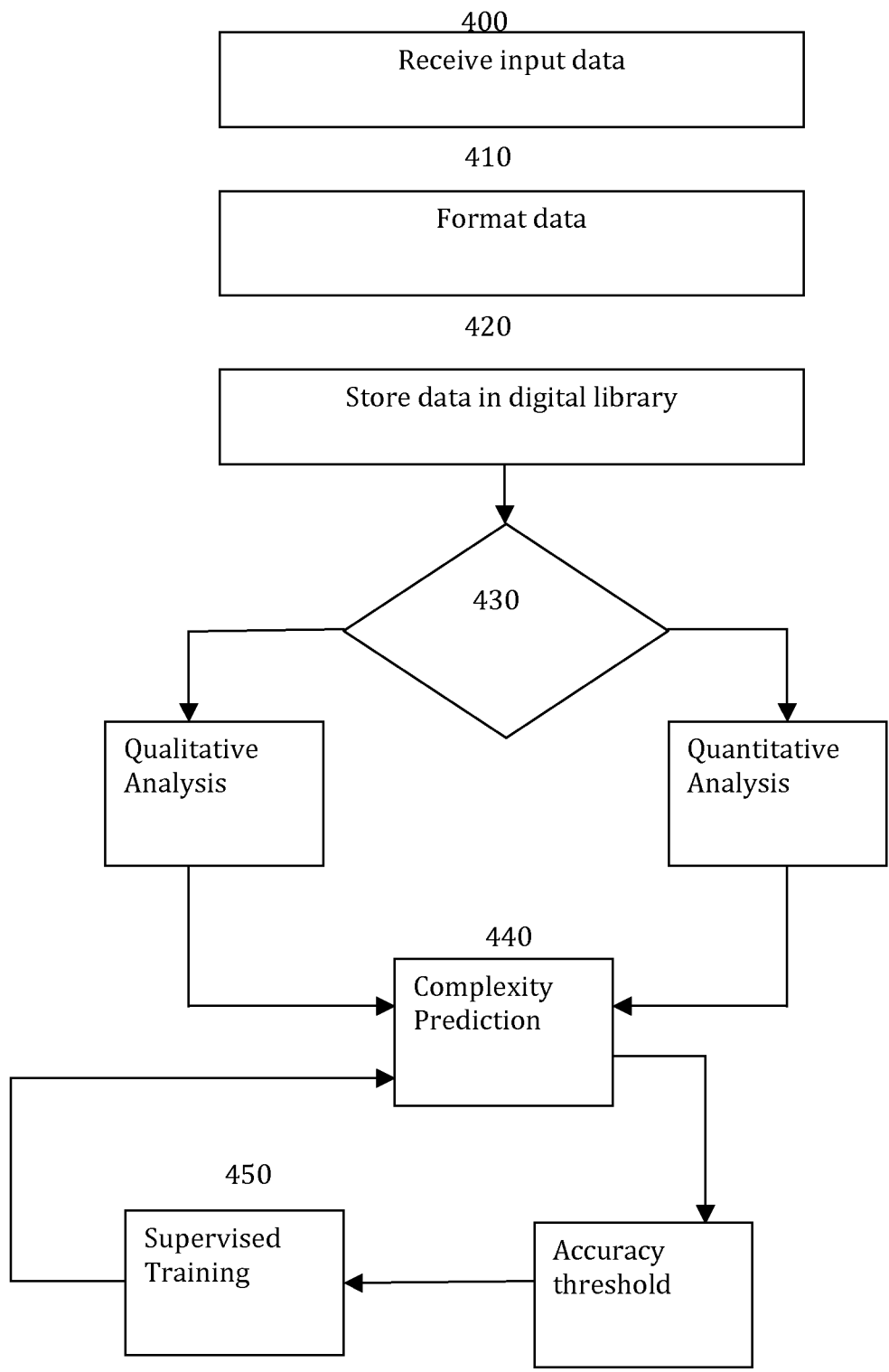
FIG. 4 is a block diagram illustrating an exemplary embodiment of the prediction of textual complexity

The machine learning artificial intelligence ("MLAI") application server 235 is dedicated to running a machine learning algorithm for predicting textual complexity of data. The machine learning algorithm includes software modules, which are stored as computer readable instructions on a computer readable medium (e.g., persistent storage) in the MLAI server for execution by one or more microprocessors. The algorithm when executed analyzes input data and performs textual complexity analysis of the data as illustrated in FIG. 4.

The MLAI application server 235 includes one or more databases for storing data used to refine the textual complexity analysis for improved accuracy of textual complexity predictions. The data includes supervised training information, which provides user rating information relating to the accuracy of the predicted textual complexities of the data stored in digital library 254; and feature resolution data, which provides for the dynamic modification of the features used in the textual complexity analysis.

A first database stores supervised training information, as illustrated in FIG. 3A. The first database 335 includes an entry for each batch of text with a predicted complexity level. For example, an entry can include, {<batch ID>, <predicted ranking>, <user ID>, <user rating>}. Batch ID is a thirty-two digit binary number which identifies a batch of text. Each input of data is assigned a batch ID. The predicted ranking is the complexity level predicted by the MLAI application server 235 for the corresponding batch of text and is a thirty-two digit binary number corresponding to a ranking level.

User ID is an identifier associated with a user of the system and is a thirty-two digit binary number. The user rating provides a rating of the predicted textual complexity, and is a eight digit binary number. For example, if the complexity of text is predicted to be a level J, which corresponds to, for example, 00000001, by the system, the user may agree or disagree. If the user disagrees, the user may enter a higher or lower level, which becomes the user's rating. If the user agrees, the user may enter the same level as predicted.

A second database stores feature resolution data, as illustrated in FIG. 3B. The second database 340 includes an entry for each feature used in the quantitative analysis of data. Each feature has an associated ID and weight factor. An entry in the second database can include, for example, {<feature ID>, <weight>}. The feature ID is an identifier, which identifies the type of feature and is an eight digit binary number. For example, the feature "word count", may be associated with the identifier "00000001".

The weight factor is a numerical value representing the importance of the associated feature when performing the textual complexity analysis and is a sixty-four digit binary number. For example, the feature word count may be more important than another feature, and therefore, would be given a higher numerical weight factor, represented, for example, by a sixty-four digit binary number.

In another exemplary embodiment, each entry in second database 340 includes, for example, {<feature id>, <range start>, <range end>, <weight>}. The range start and range end values are binary numbers identifying a range of the leveling system, which corresponds to a particular weight factor for a given feature.

Web server 240 provides web services to the one or more clients and database server 245 provides database services to the one or more clients in the data processing system.

Each server 235, 240 and 245 includes one or more microprocessors, computer readable memory (e.g., read-only memory (ROM), random access memory (RAM), and persistent storage), mechanisms and structures for performing I/O operations.

Storage device 250 includes one or more persistent storage devices, and data control unit includes one or more storage controller and database manager units. The storage device can be implemented with a variety of components or subsystems including, for example, a magnetic disk drive, an optical drive, flash memory, or any other devices capable of persistently storing information. The storage device includes one or more databases 251 and stores operating system code and application programs 252, data and files 253 and a digital library 254.

The digital library 254 includes two or more databases, the first that houses bibliographic data in an indexed and searchable manner, and a second that contains the digital content of the electronic literature analyzed by the MLAI application server 235. All bibliographic metadata concerning those electronic documents stored in the digital content database are necessarily contained in the bibliographic database. The bibliographic database can also contain bibliographic metadata of works not stored in the digital content database. The digital library also includes application code to manage the contents of both databases.

The storage controller and database manager include one or more microprocessors, computer readable memory (e.g., read-only memory (ROM) and random access memory (RAM)), mechanisms and structures for performing I/O operations. Storage controller and database manager can execute an operating system for command execution on the one or more microprocessors and one or more application programs for controlling the operations of the storage device(s) and database(s). The application programs can be developed using any suitable computer programming language, such as, for example, Java programming.

The data center unit 130 includes an administrative user interface 260 for allowing administrative user interaction. The administrative user interface includes a graphical user interface (GUI), which includes a menu-driven interface. In an exemplary embodiment, the GUI presents a user with one or more menus to make selections for a supervised training session. The administrative user interface may also be operated by a command line interface (CLI), which includes a series of commands executed in a terminal.

When an administrative user initiates a supervised training session, the MLAI application server 235 executes a supervised training module, which stores supervised training information in first database 335. Additionally, when an administrative user initiates a feature resolution session, the MLAI application server executes a feature resolution module, which stores feature resolution data in second database 340.

FIG. 4 is a diagram illustrating an exemplary embodiment of a machine learning algorithm for performing dynamic textual complexity analysis for predicting the textual complexity of data. At step 400, the machine learning artificial intelligence ("MLAI") application server 235 receives input data, which includes text. The input data may be received from client devices 110 *a-c*. In an exemplary embodiment the input data is literary text in the English language.

In another exemplary embodiment the data is text of a non-English language. The language can be any suitable language, such as, for example, Spanish, French, etc.

At step 410, the input data is converted into a suitable format for processing. For example, in an exemplary embodiment, an ePub format may be used for processing. However, any digital text can be used for processing. The formatted data is incorporated into digital library 254, which is stored in storage device 250, at step 420. The incorporation of the data into the digital library requires meta data analysis and categorization of the data.

Meta data, such as, for example, bibliographic data will come from analysis of the content distributed with the book (e.g. a copyright page) or looked up from some external service, such as, for example, Amazon or Google via its ISBN. Categorization will occur using the Library of Congress' standard categorization.

A single user has access to the content database in the digital library. The user may access the digital content, for example, through logged HTML get requests as framed by the bibliographic database. Every access by that user is recorded. All users have access to the bibliographic content.

At step 430, quantitative analysis of the data is performed in parallel with qualitative analysis of the data. The quantitative analysis determines the structural complexity of the data. The quantitative analysis parses the data using natural language processing techniques and ranks the data dynamically as compared to other texts through dynamic feature analysis. Features of the data are identified and are assigned a weight factor.

Features are variables/metrics, which are used to determine the complexity of the structure of the data. For example, a feature can be word frequency, sentence length, word count, etc. A set of criteria rules are used to determine the weight factor of the feature. For example, using the rule word frequency >word count >sentence length, the weight factor assigned to word frequency must be higher than the weight factor assigned to word count and sentence length. The weight factor assigned to word count must be higher than the weight factor assigned to sentence length. The features and the weight factors are used to determine the structural complexity of the data. The features, weight factors and criteria rules are dynamic and can be changed at any time.

The complexity of the structure of the data is determined using an algorithm, which receives as input the numerical values of the identified features measured against its corresponding weight factor. In an exemplary embodiment, the algorithm is an application specific multi-variate linear regression algorithm using a normal equation to properly fit the data to predict where a particular piece of texts fits on a linear hierarchy. In another exemplary embodiment the algorithm is an application specific multi-variate linear regression algorithm using a gradient descent search algorithm. Clustering is performed to group similar texts among a set of distinct categorizations, which is the interim output of the quantitative analysis process.

The qualitative analysis of the data determines the core concepts and variations of concepts of the data. The qualitative analysis uses an ontological inference process to construct a concept mapping using concept mining techniques to discover topics addressed in the data. These topics are analyzed to determine their organizational complexity and sub-topics are mined. Groups of related topics are generalized to create heuristics about the complexity of subject specific information, which is the interim output of the qualitative process.

Every concept is part of the ontology and the ontology is ranked using an external learning mechanism. The ranking determines how complex concepts are relative to each other. An aggregated qualitative score is achieved by scoring the number of concepts vs. the relative complexity of each concept (i.e. how complex one concept is adjacent to others) and the base complexity of the concept. This score is then used as a feature in the overall linear regression feature analysis for determining complexity.

The final prediction of the complexity of the data is determined based on the complexity of the structure of the data and the complexity of the concepts of the data, at step 440, based on the data generated from the quantitative analysis and qualitative analysis. The algorithm applies the created heuristics about the complexity of the subject specific information to the interim levels, i.e. the distinct categorizations, output from the quantitative analysis to predict the textual complexity of the data.

The results of the qualitative analysis are merged into those of the quantitative analysis via a weighted average of the textual complexity produced by both analyses. The ontological features mined by the qualitative analysis determine the weight of the qualitative feature through a heuristic ranking of qualitative features similar to that of the quantitative features. The predicted level of complexity for the data is stored in digital library 254 with the data.

At step 450, supervised training information is obtained. The supervised training information can be received on an ongoing basis from one or more administrative users. When an administrative user initiates a supervised training session, a supervised training module is executed which extracts supervised training information from the user. The supervised training information is user rank and rating information corresponding to the predictions that have been made by the machine learning algorithm. Statistical analysis is performed on the information to evaluate the accuracy of the predictions made by the machine learning algorithm.

The machine learning algorithm performs dynamic modification of the features used in the textual complexity analysis. For example, features may be added or removed. Additionally the weight factor of the features may be modified, i.e. increased or decreased.

Features may be removed, for example, based on coefficients of a polynomial function that describe a best fit line as calculated by a normal equation (i.e. a multivariate linear regression). The coefficients are dynamic in nature because as more training data is received, the equation is recalculated and the coefficients change. When unleveled text is received, such as, for example, the text of a book, the coefficients are used to predict where that book's features fall on the line, and thus come up with a leveled prediction. This then forces a recalculation of the normal equation. As more user feedback is received about the book, and the book shifts, the normal equation is recalculated again. If one of those coefficients goes to zero, then the corresponding feature(s) is effectively removed.

Feature additions may occur, for example, using a feature mining technique.

Weight factor modification of the features may occur, for example, using a polynomial best fit line with many curves. Features that have statistically significant higher coefficients from a multi variate linear regression in one range versus all other ranges will be flagged. Since, some features may fare better in a smaller data space (e.g. at lower levels), it is possible to identify those features by observing how the coefficients change across particular ranges of the leveling system. These features will then have a range-weight applied, and will be stored as feature resolution data in second database 340. Accordingly, when data falls into a feature's range during the first calculation, the range will be recalculated with the more important feature having a higher weight.

Whenever the features are modified, the machine learning algorithm reevaluates all the data in the digital library and re-predicts the textual complexity of the data consistent with the modified features.

Machine learning artificial intelligence is derived from a constant feedback of supervised training information and feature resolution data. Thus, if a statistically significant group of users (e.g., human experienced in the field) down grade or upgrade a text ranked at a particular complexity level, the machine learning algorithm modifies the complexity level of the data consistent with the group of users. Further, as industry standards and philosophies change regarding how text should be evaluated for complexity, the machine learning algorithm improves its performance using the feature resolution data and criteria rules to provide accurate predictions of textual complexity consistent with industry changes.

Computer readable instructions are computer code stored on a computer readable medium executed and interpreted by a processor. The term computer readable medium includes, for instance, a disk shaped media such as CD-ROM (compact disc-read only memory), magneto optical disc or MO, digital video disc-read only memory or DVD-ROM, digital video disc-random access memory or DVD-RAM, a floppy disc, a memory chip such as random access memory or RAM, read only memory or ROM, erasable programmable read only memory or E-PROM, electrical erasable programmable read only memory or EE-PROM, a rewriteable card-type read only memory such as a smart card, a magnetic tape, a hard disc, and any other tangible means for storing a program therein.

The disclosed embodiments are not inclusive and many other modifications and variations will be apparent to someone of ordinary skill in the art with construction skills in the related arts. Further, the steps of the disclosed methods can be modified in various manners, including by reordering steps, executing multiple steps concurrently, and/or inserting or deleting steps, without departing from the principles of the invention. Together the descriptions and accompanying illustrations seek to provide an explanation of the basic principles of the embodiment and its application. It is therefore intended that the specification and embodiments be considered as exemplary only.

Moreover, while illustrative embodiments of the invention have been described herein, further embodiments can include equivalent elements, modifications, omissions, combinations (e.g., of aspects across various embodiments) adaptations and/or alterations as would be appreciated by those skilled in the art based on the present disclosure.

As disclosed herein, embodiments and features of the invention can be implemented through computer hardware and/or software. Such embodiments can be implemented in various environments, such as networked and computing-based environments with one or more users. The present invention, however, is not limited to such examples, and embodiments of the invention can be implemented with other platforms and in other environments.

What is claimed:

1. A method of determining textual complexity by performing dynamic analysis of text using machine learning artificial intelligence, comprising the steps of:
    a) receiving, in an application server, input data;
    b) formatting, by the application server, the received input data;
    c) storing, by the application server, the formatted data in a storage device creating a digital library;
    d) performing, by the application server, quantitative analysis of the input data in parallel with the application server performing qualitative analysis of said input data;
    e) executing complexity analysis, by the application server, of the input data using data generated from said performed quantitative analysis and qualitative analysis to predict the textual complexity of the input data;
    f) refining, by the application server, the complexity analysis of said input data using the machine learning artificial intelligence; and
    g) providing improved accuracy of textual complexity predictions based on the refined complexity analysis.

2. The method of claim 1, wherein the machine learning artificial intelligence uses continuous feedback data to perform said refining of predictions.

3. The method of claim 2, wherein the continuous feedback data includes supervised training information and feature resolution data.

4. The method of claim 3, wherein the supervised training information is generated from a supervised training session.

5. The method of claim 4, wherein the supervised training session receives ranking and rating information from a user.

6. The method of claim 5, wherein an accuracy evaluation is made, by the application server, based on statistical analysis of said user ranking and rating information.

7. The method of claim 6, wherein the machine learning artificial intelligence uses the accuracy determination made by the application server to perform said refining of predictions.

8. The method of claim 3, wherein the feature resolution data is derived from a polynomial best fit line analysis.

9. The method of claim 8, wherein the polynomial best fit line analysis generates feature modification parameters.

10. The method of claim 8, wherein the feature modification parameters include feature id[ ], range start[ ], range end[ ], and weight[ ].

11. The method of claim 3, wherein steps d) and e) are repeated for each entry of data stored in the digital library when feature resolution data is received.

12. The method of claim 1, wherein the quantitative analysis determines structural complexity of data by evaluating features identified in the data.

13. The method of claim 12, wherein the features are evaluated using a weight factor.

14. The method of claim 13, wherein the weight factor establishes the importance of a feature relative to other features in the determination of textual complexity.

15. The method of claim 1, wherein the qualitative analysis determines the complexity of the concepts of the data.

16. A data processing system for performing dynamic textual complexity analysis using machine learning artificial intelligence comprising:
   one or more client devices, wherein each client device is connected to a network system;
   a data center unit comprising:
      a network interface unit for interfacing with the one or more client devices and the network system;
      a user interface;
      one or more storage devices, wherein the one or more storage devices comprise one or more databases;
      a storage device controller and database manager for controlling the operations of the one or more storage devices and one or more databases;
      a web server for providing web services to the one or more clients; and
      a database server for providing database services to the one or more clients;
      a machine learning artificial intelligence ("MLAI") application server for predicting textual complexity of data, the machine learning artificial intelligence application server includes one or more databases for storing data used to refine textual complexity analysis for improved accuracy of textual complexity predictions.

17. The data processing system of claim 16, wherein the one or more storage devices includes a digital library.

18. The data processing system of claim 16, wherein the MLAI application server includes a first database for storing supervised training information.

19. The data processing system of claim 16, wherein the MLAI application server includes a second database for storing feature resolution data.

20. The data processing system of claim 16, wherein the MLAI application server uses continuous feedback data to perform said refining of textual complexity analysis.

* * * * *